(12) United States Patent
Ransom et al.

(10) Patent No.: US 7,987,290 B2
(45) Date of Patent: Jul. 26, 2011

(54) SECURITY MODES FOR A ROUTING TABLE DISTRIBUTED ACROSS MULTIPLE MESH NODES

(75) Inventors: Kevin C. Ransom, Duvall, WA (US); Sandeep K. Singhal, Kirkland, WA (US); Ramakrishna P. Pamulapati, Redmond, WA (US); Tyler M. Barton, Seattle, WA (US); Jeremy L. Dewey, Redmond, WA (US); Todd R. Manion, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 362 days.

(21) Appl. No.: 11/963,782

(22) Filed: Dec. 21, 2007

(65) Prior Publication Data

US 2009/0164663 A1 Jun. 25, 2009

(51) Int. Cl.
*G06F 15/173* (2006.01)
(52) U.S. Cl. ........ 709/243; 709/241; 709/242; 709/244; 709/245
(58) Field of Classification Search .................. 709/243, 709/244, 242, 245, 241
See application file for complete search history.

(56) References Cited

U.S. PATENT DOCUMENTS

| | | | |
|---|---|---|---|
| 5,941,955 A | 8/1999 | Wilby et al. | |
| 6,785,728 B1 | 8/2004 | Schneider et al. | |
| 7,239,633 B1 | 7/2007 | Chiou | |
| 7,366,113 B1 * | 4/2008 | Chandra et al. | 370/255 |
| 2004/0088431 A1 | 5/2004 | Carter | |
| 2004/0190477 A1 | 9/2004 | Olson et al. | |
| 2004/0260834 A1 | 12/2004 | Lindholm et al. | |
| 2005/0275532 A1 * | 12/2005 | Ferri et al. | 340/539.26 |
| 2006/0253606 A1 | 11/2006 | Okuno | |
| 2007/0002869 A1 | 1/2007 | Miller | |
| 2007/0006314 A1 | 1/2007 | Costa et al. | |
| 2008/0040509 A1 * | 2/2008 | Werb et al. | 709/242 |
| 2008/0225860 A1 * | 9/2008 | Manion et al. | 370/395.31 |

OTHER PUBLICATIONS

Ei-Khatib, et al., "Secure Dynamic Distributed Routing Algorithm for Ad Hoc Wireless Networks", International Workshop on Wireless Security and Privacy (WiSPr 2003), National Research Council of Canada, 2003, pp. 9.
Pourebrahimi, et al., "A Survey of Peer-to-Peer Networks", Proceedings of the 16th Annual Workshop on Circuits, Systems and Signal Processing, ProRisc 2005, Nov. 2005, pp. 8.
"Distribution of code and binaries over the Internet—Analysis of the problem and preliminary specification of the target architecture", EDOS, 2005, pp. 1-74.
Herbert, "What Happened to Pastry", ACM SIGOPS Operating Systems Review, vol. 41, Issue 2, 2007, pp. 10-16.
"Peer Name Resolution Protocol", Microsoft Corporation, 2007, pp. 1-7.
U.S. Appl. No. 11/716,896, filed on Mar. 12, 2007 Inventor(s) Manion et al., entitled "Distributed Routing Table Interface ".
International Search Report and Written Opinion in PCT/US2008/084617 dated May 26, 2009.
Seung Yi et al.; "Security Aware Ad-Hoc Routing for Wireless Networks"; Proceedings of ACM Symposium on Mobile Ad Hoc Networking & Computing; Aug. 2001.
Yih-Chun Hu et al.; "Ariadne: A Secure On-Demand Routing Protocol for Ad Hoc Networks"; MobilCom 2002, Sep. 23-28, 2002.

* cited by examiner

*Primary Examiner* — Jeffrey Pwu
*Assistant Examiner* — Abdelnabi O Musa

(57) ABSTRACT

A mesh is joined by a node, wherein the mesh includes a Distributed Routing Table (DRT) for determining addresses of nodes in the mesh. A DRT message is processed in accordance with a security mode of the DRT.

20 Claims, 7 Drawing Sheets

400 BASIC MODE

500 BASIC MODE

800 CONFIDENTIALITY MODE

900 CONFIDENTIALITY MODE

SECURITY MODES FOR A ROUTING TABLE DISTRIBUTED ACROSS MULTIPLE MESH NODES

BACKGROUND

Peer-to-peer (P2P) networks provide a serverless communications environment. Most P2P networks today are open and unsecure. A peer within a P2P network may provide routing information to another peer and lookup routing information at another peer without security considerations such as authentication or authorization.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention provide security modes for a Distributed Routing Table (DRT). A DRT includes a table with entries that are distributed across a group of machines that can be used to map keys to endpoints by finding routes through a network of peers. In one example, a basic security mode requires nodes to prove the right to publish keys. In another example, a membership security mode requires nodes to prove the right to publish keys and lookup keys. In yet another example, a confidentiality security mode requires nodes to prove the right to publish keys, lookup keys, and at least a portion of data in DRT messages is encrypted so that the data is obscured from unauthorized nodes sniffing DRT traffic.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

A peer-to-peer network provides a serverless environment for collaboration between multiple computing devices. A P2P network connects devices in an ad-hoc manner into a collection of nodes called a mesh (or overlay network). A mesh operates on an underlying transport layer (e.g., an IPv4 or IPv6 network) or physical network (e.g., a wireless transmission capability). Also, the DRT is agnostic to this layer and is abstracted into one of the separable and pluggable layers (called transport).

A DRT supports the routing of information in a mesh. The DRT comprises a set of routing tables distributed across several nodes in the mesh. The DRT may be used by a node to determine a route (e.g., a series of Internet Protocol (IP) addresses, physical addresses (e.g., MAC addresses), or device IDs) to a target node in the mesh and the network address of the target node itself. The DRT may include routing entries for a key (e.g., a numeric identification (ID) for a node, a string ID for a node, etc.) and its corresponding network address. Each node may use a portion of the DRT stored locally or at another node to search for a key. Once the node finds the desired key in the DRT, the node can determine the network address for the target node; the set of nodes whose local DRT portions were queried during the key lookup process together form a route to the target node. The node may then use the target node's network address (and/or the route discovered during key lookup) to contact the target node for establishing communications (e.g., file sharing).

Figure 1:
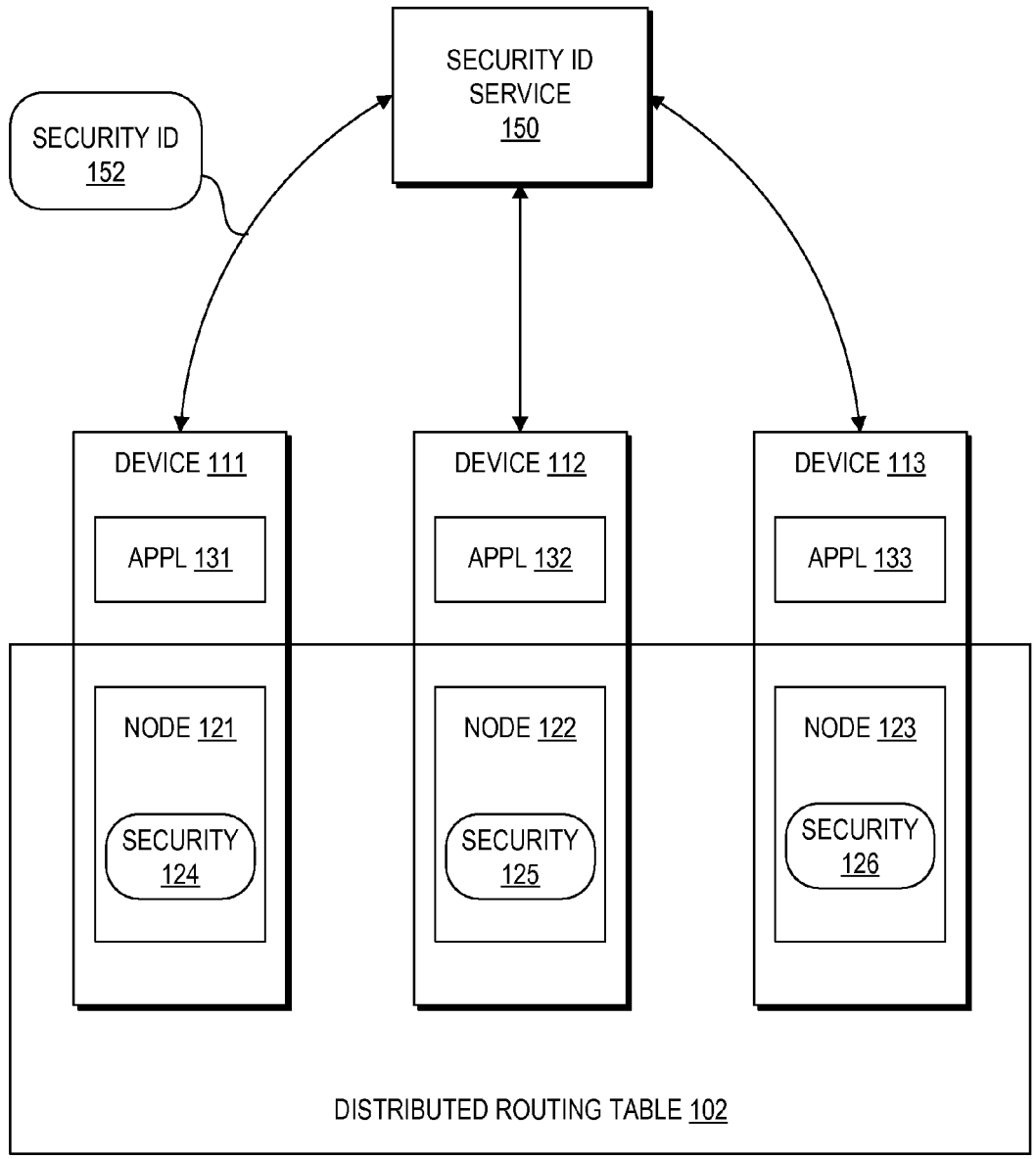
FIG. 1 is a block diagram of a distributed routing table in accordance with an embodiment of the invention.

FIG. 1 shows a system 100 in accordance with an embodiment of the invention. In one embodiment, one or more components of system 100 may be implemented by computer readable instructions executable by one or more computing devices. An example computing device is discussed below in conjunction with FIG. 10.

System 100 includes a DRT 102 for supporting a mesh including nodes 121-123. Nodes 121-123 are executing on computing devices 111-113, respectively. DRT 102 is distributed across multiple nodes 121-123 seeking to collaborate via a same application. Each node 121-123 includes a separate portion of DRT 102. In one embodiment, a single device may support two or more nodes (also referred to as node instances) that are participating in one or more meshes. For example, a single application may instantiate two different nodes that participate in the same mesh.

Applications 131, 132, and 133 are shown on each device 111-113, respectively. The application uses the P2P mesh for exchanging information relevant to the application. Example applications include file sharing, real-time collaboration, distributed search engines, Voice over Internet Protocol (VoIP), etc.

In one embodiment, nodes use a componentized model. A node component includes protocol handlers and core APIs. The node component references pluggable modules for separable subsystems that may include routing table management, transport, bootstrap, security, and logging. Each module can be instantiated by an application.

An embodiment of a pluggable module includes a security module. In one embodiment, each node in a mesh uses the same security module implementation for operating and managing security modes as described herein, such as security modules 124-126 shown at nodes 121-123, respectively. A security module allows DRT 102 to implement a set of security modes that allow application authors to configure security settings for their P2P meshes. Applications may configure a DRT with various security settings as desired. More security generally costs more in routing bandwidth and requires more computation, but allows for tighter management and better privacy.

Embodiments of security modes for DRT 102 include (from least security level to highest security level) basic security mode, membership security mode, and confidentiality security mode. In one embodiment, a security mode includes the features of the security modes below it. For example, membership mode includes the security features of the basic mode as well as adding its own security features.

FIG. 1 also includes a security identification (ID) service 150. A device may communicate with service 150 to obtain a security ID 152 for use with security modes as described herein. A security ID allows a node to prove its right of participation to other nodes in the mesh. An example security ID includes a certificate.

Figure 2:
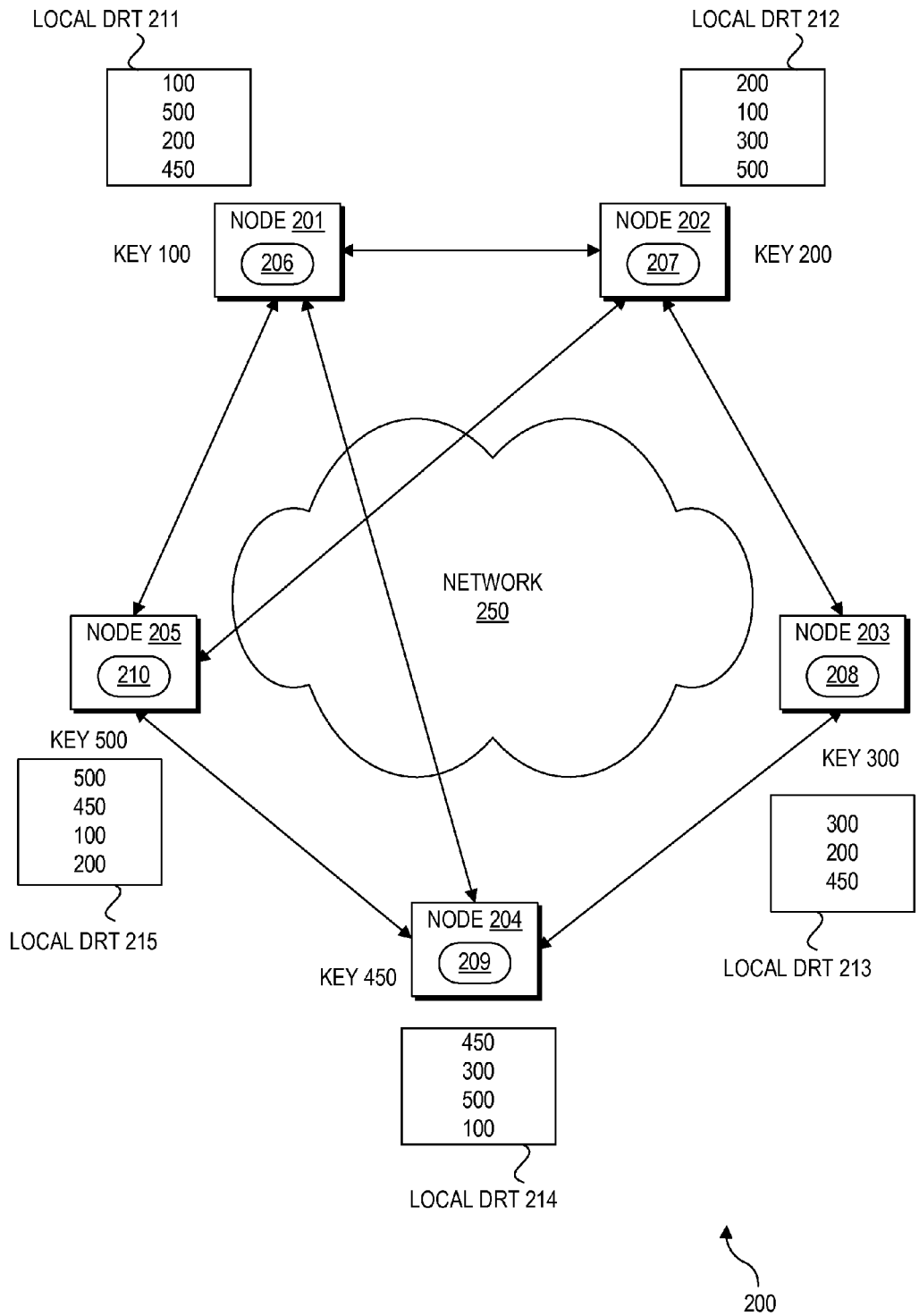
FIG. 2 is a block diagram of a peer-to-peer network using a distributed routing table in accordance with an embodiment of the invention.

Turning to FIG. 2, an embodiment of a mesh 200 for a P2P network is shown. Mesh 200 includes five nodes 201-205, each node having a security module 206-210, respectively. The nodes may be supporting applications or services on a mix of computing devices, such as desktop PCs, servers, mobile devices, and the like (not shown).

Mesh 200 is formed on top of underlying transport layer (e.g., an IPv4 or IPv6 network, or physical network) shown as network 250. Each node stores and maintains a portion of the distributed routing table. A node's portion of the DRT is referred to as the node's local DRT. In FIG. 2, nodes 201-205 store local DRTs 211-215, respectively. The combination of local DRTs 211-215 make up the whole DRT for the mesh.

In order to find an address (e.g., IP address) to a node in the mesh, a node may search for another node's key. The searching node may perform lookup operations with other nodes' local DRTs, until the target key of the search is found. A node may also publish its own key to the mesh in order to populate the DRT with its key.

In one embodiment of a search algorithm, a node may search for a key by looking for the key in the node's local DRT. If the key is not found, then the node starts searching the local DRTs of other nodes. For example, a searching node asks a node that has a key closest numerically to the desired key whether the node has the key in its local DRT. The node in turn looks in its own local DRT and returns either the address of the requested node corresponding to the key or the address of a node publishing the key numerically closest in its local DRT. This is repeated until either the key is found or it has been determined that no such key exists. Examples of such a routing system include a Distributed Hash Table (DHT) and a Peer Name Resolution Protocol (PNRP). The DRT provides a routing cache infrastructure for these routing systems.

A DHT is used to store information identified by keys. In DHT, a keyspace includes a set of keys. The keyspace is split up among the nodes in the mesh. Each node is responsible for a range of keys. When a node wants to store or retrieve information for a particular key it must first find a node that is responsible for the key, the node searches for a node that is responsible for that key range. For example, in FIG. 2, node 201 may have a root of 15 and be responsible for keys 8-22, node 202 may have a root of 26 and be responsible for keys 23-31, and so on. Usually only one node publishes the keys for a particular key range. When nodes enter and leave the mesh, the key ranges assigned to the nodes are adjusted. The adjustment may be made across all nodes or a portion of the nodes in the mesh.

In PNRP, a node maintains the stored information for its own keys published to the mesh. Thus, a node may publish multiple keys and a particular key may be published by more than one node (as compared to DHT which normally assigns each key to only one node). Also, as a node communicates with other nodes, the keys for those others nodes are added to the node's local DRT.

It will be appreciated by one skilled in the art having the benefit of this description that PNRP secure names may be distinguished from DRT security as described herein. A PNRP secure name allows a node to prove that it owns a particular key to prevent spoofing of a key; it achieves this by combining the name with the public key of the registering node, and providing a certificate proving ownership of the public key. However, PNRP does not have security measures that control the right of a node to publish a key or look up a key.

An example of PNRP is shown in FIG. 2. Each node 201-205 has its own key (i.e., its root) 100, 200, 300, 450, and 500, respectively. Each node 201-205 stores its own key as well as other keys in its local DRT. Assume node 201 wants to determine the endpoint (i.e., node) for the key (i.e., PNRP ID) of 300. Node 201 looks in its own local DRT 211 for key 300 and does not find it. Node 201 then finds the key in its local DRT 211 that is numerically closest to the desired key 300. In this case, key 200 is closest to key 300, so node 201 sends a PNRP request message to the node corresponding to key 200 (i.e., node 202). Because node 202 has key 300 in its cache (i.e., local DRT 212), node 202 sends the address (e.g., IPv6 address) of node 203 (which corresponds to key 300) to node 201. Node 201 may then send a PNRP request message to node 203 using the address to begin communications with node 203. Node 201 also adds key 300 to its own local DRT 211.

Whether using DHT, PNRP, or some other routing system, embodiments herein provide security regarding publication of and access to information in DRTs.

Figure 3:
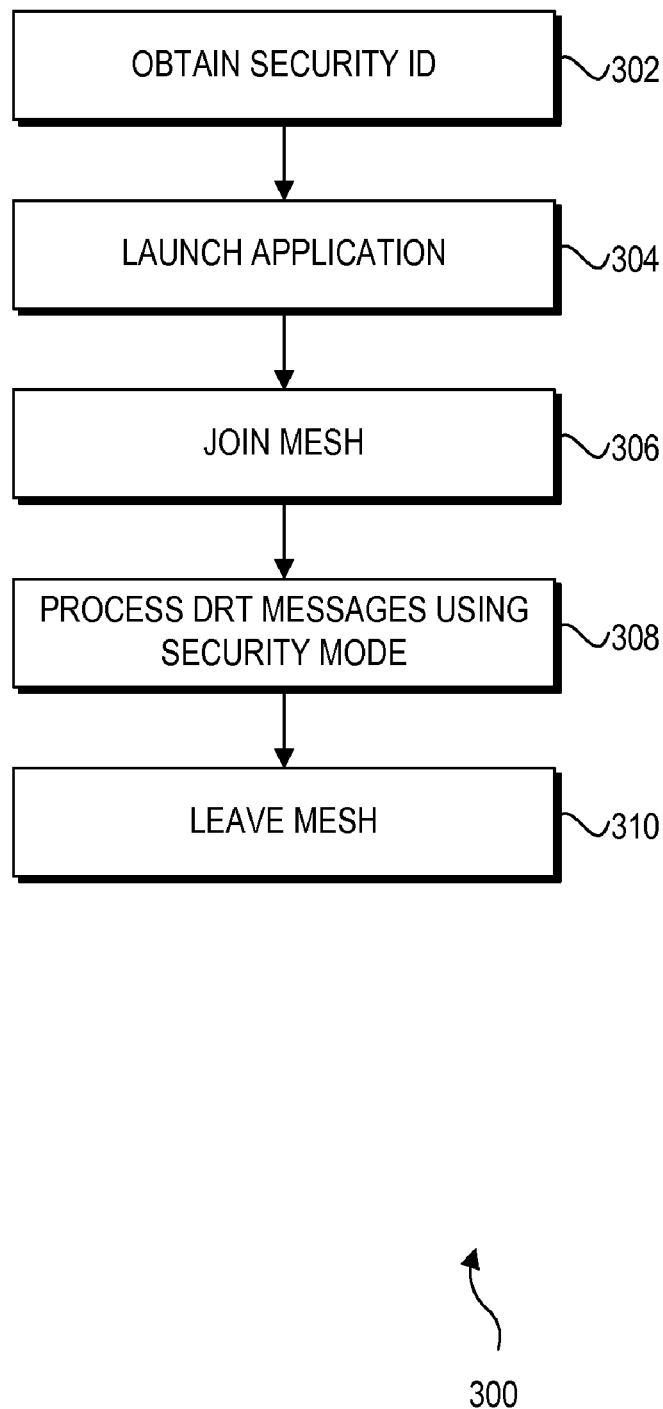
FIG. 3 is a flowchart showing operations of using security modes with a distributed routing table in accordance with an embodiment of the invention.

Turning to FIG. 3, a flowchart 300 shows operations of using security modes with a distributed routing table in accordance with an embodiment of the invention. In one embodiment, at least a portion of flowchart 300 may be implemented by computer readable instructions executable by one or more computing devices.

Starting with operation 302, a security ID is obtained. The security ID may be obtained out of band from participation in the mesh. For example, a computing device may connect to a security ID service (such as a Web site) and obtain a security ID.

The security ID may be valid for a particular term, such as a single P2P session. For example, a user may want to join a P2P network as part of a news web site. The user obtains a certificate from the news web site and uses the certificate in DRT messages. Each node receives a unique security ID that can be traced back to an issuer (e.g., via a certificate chain). All nodes in a mesh receive a security ID so that the nodes may authenticate various DRT messages from each other as described below.

Next, in operation 304, an application for use with a P2P network is launched. In one embodiment, the application is pre-preprogrammed with the desired security mode. In one embodiment, security modes are not mixed in the mesh, so all nodes use the same DRT security mode. When an application wishes to join a mesh, there may be certain mesh-wide configuration expectations. For example, an application may be expected to communicate using a Transmission Control Protocol (TCP) instead of another protocol like User Datagram Protocol (UDP). Similarly, the mesh will expect joining applications to use a particular security mode as described herein.

Continuing to operation 306, a node is created and joins a mesh. For example, a node instance of the DRT for the mesh is opened. Next, in operation 308, DRT messages are processed using a security mode as described herein. Processing a DRT message includes constructing and sending DRT messages as well as receiving, authenticating, and processing authenticated DRT messages. A DRT message includes messages related to local DRT cache maintenance and searching operations, such as a flood message (used to signal the presence of a key to peers), a lookup message (used to find the owner of a key), an inquire message (used to request a security ID for authentication), an authority message (used to deliver a security ID for authentication), and the like.

Proceeding to operation 310, the node leaves the mesh. For example, the node instance of the DRT is closed.

An example of the operations of FIG. 3 is as follows. A sports web site has a mesh for distributing sports blogs to users. A user goes to the sports web site and signs up for the blogs. During the signup process, the user receives a certificate for use with the mesh. The user then launches an application on their client machine to join the mesh. When the node associated with the user registers its presence in the mesh (e.g., publish its key), the other nodes will authenticate the certificate to ensure that the user's node is authorized to publish keys in the mesh.

Further, the user's certificate may have a limited term. For example, the sports blog service may cost users a monthly fee. The certificate is renewed each month when the user pays the monthly fee. If the user does not pay the monthly fee, then the certificate expires and the user can no longer use the sports blog mesh. The user in practical terms cannot use the mesh because any publish key messages sent by the user's node will be ignored by the other nodes in the mesh. Since the node's key will not be added to the DRT, other nodes will not be able to find the node's network address.

Figure 4:
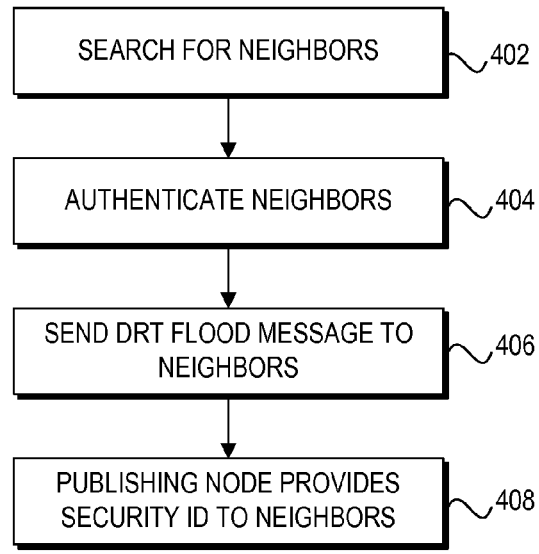
FIG. 4 is a flowchart showing operations of a basic security mode for a distributed routing table in accordance with an embodiment of the invention.
Figure 5:
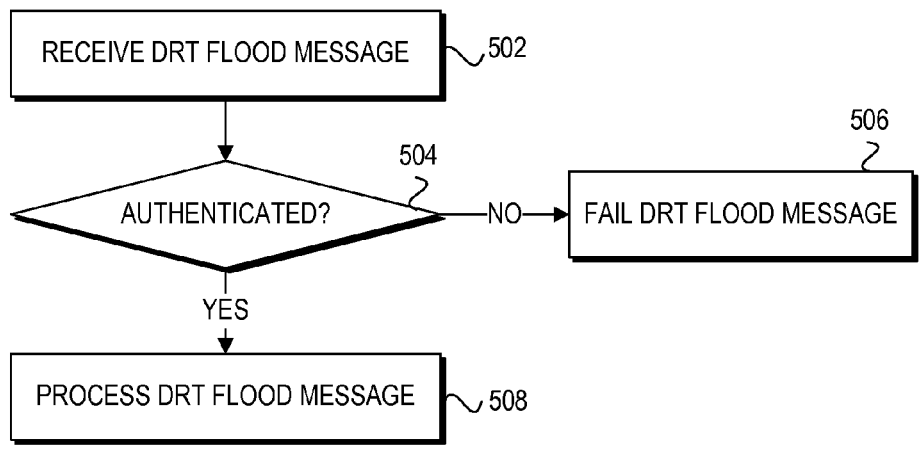
FIG. 5 is a flowchart showing operations of a basic security mode for a distributed routing table in accordance with an embodiment of the invention.

Turning to FIGS. 4-5, flowcharts 400 and 500 show operations of a basic security mode in accordance with an embodiment of the invention. In one embodiment, at least a portion of flowcharts 400 and 500 may be implemented by computer readable instructions executable by one or more computing devices. In another embodiment, logic of flowcharts 400 and/ or 500 are implemented by a security module at a node.

In one embodiment, basic security mode is used for control of publishing keys. This way, nodes in a mesh are assured that an unauthorized node is not seeding DRTs with false keys. Such false keys may be used to point peers to addresses having malicious purposes. It will be appreciated that basic mode does not prevent a peer node from searching a node's local DRT (i.e., performing a DRT lookup). In basic mode, any node can still search another node's local DRT.

Flowchart 400 shows operations of publishing a key in accordance with an embodiment of the invention. The node publishing a key searches the mesh for neighbor nodes that need to be made aware of the new key (operation 402). In doing so, the publishing node requests a security ID from the neighboring nodes that are found. In turn, the neighbors send their security IDs to the publishing node for authentication (operation 404). All authenticated neighbors will receive a flood message as described below. In one embodiment, a potential neighbor includes nodes having keys close to the publishing node's key as well as random nodes in the mesh. By publishing its key to various nodes in the mesh, the publishing node seeds other nodes' local DRTs with its key.

The publishing node alerts these neighbor nodes (i.e., future neighbors in the keyspace) of the presence of the new key by sending a DRT flood message to the neighbors (operation 406). A flood message signals the presence of a key to the publishing node's neighbors.

In turn, the neighbors request authentication from the publishing node and the publishing node supplies its security ID to the requesting neighbors (operation 408). In one embodiment, a neighbor sends an inquire message to the publishing node to request the security ID and the publishing node responds with an authority message having the security ID to the neighbor. In an alternative embodiment, the security ID is provided to the neighbor by including the security ID of the publishing node in the DRT flood message sent in operation 406.

Flowchart 500 shows the operations of a node receiving a DRT flood message in accordance with an embodiment of the invention. Starting in operation 502, the node receives the DRT flood message. Next, in operation 504, the node authenticates the security ID of the publishing node associated with the received flood message. In one embodiment, the receiving node requests and receives the publishing node's security ID in an inquire-authority message exchange. In another embodiment, the publishing node's security ID is included in the DRT flood message.

The receiving node validates the security ID by comparing the issuer of the attached security ID to the issuer of the receiving node's own security ID and ensuring the issuers match (e.g., security ID service 150). For example, the attached certificate is compared by the receiving node against a configured root certificate chain for its own certificate. The sending node is authenticated if its certificate chain has the same root chain.

If the security ID is authenticated, then the DRT flood message is processed, as shown in operation 508. For example, the key and corresponding IP address in the DRT flood message are added to the node's local DRT.

If the security ID is not authenticated, then the logic proceeds to operation 506 to fail the received DRT flood message. In one embodiment, the node ignores the message (e.g., lets the message time out). In another embodiment, the node responds that it did not understand the message.

Figure 6:
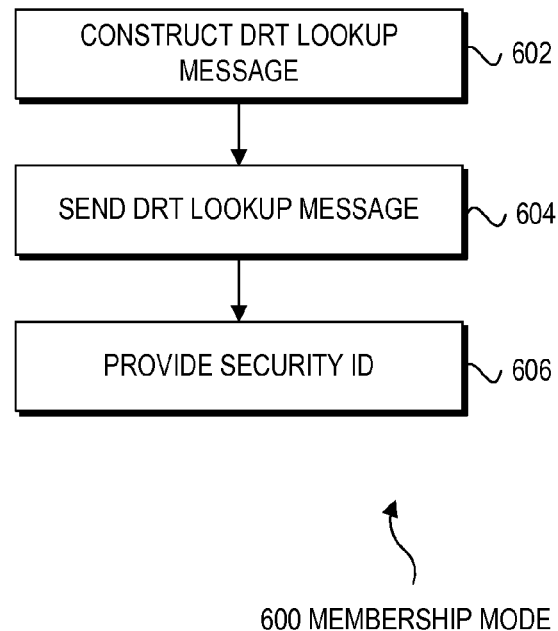
FIG. 6 is a flowchart showing operations of a membership security mode for a distributed routing table in accordance with an embodiment of the invention.
Figure 7:
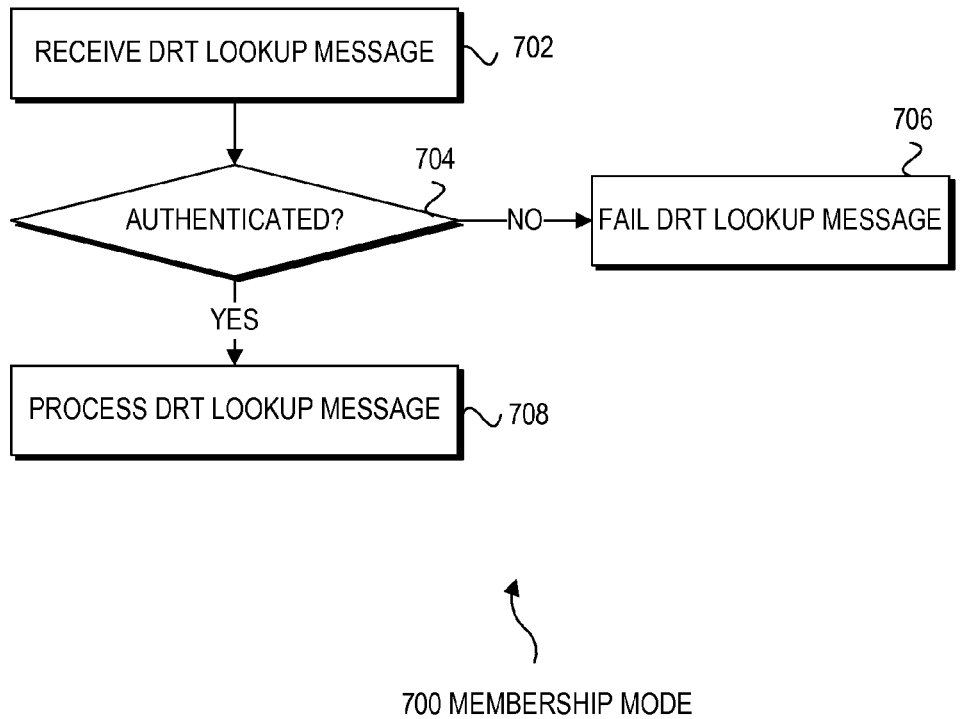
FIG. 7 is a flowchart showing operations of a membership security mode for a distributed routing table in accordance with an embodiment of the invention.

Turning to FIGS. 6 and 7, flowcharts 600 and 700 show operations of a membership security mode in accordance with an embodiment of the invention. In one embodiment, at least a portion of flowcharts 600 and 700 may be implemented by computer readable instructions executable by one or more computing devices. In another embodiment, logic of flowcharts 600 and/or 700 are implemented by a security module at a node.

In one embodiment, membership mode requires nodes to prove their membership in the mesh before being allowed to publish keys and to lookup keys. In membership mode, a node has to prove the right to search another node's local DRT. Membership mode ensures that nodes that attempt to connect to other nodes (i.e., find their network address) are valid participants in the mesh. Membership mode includes the publish key security measures as described above in connection with FIGS. 4 and 5.

Flowchart 600 shows operations of sending a DRT lookup message in accordance with an embodiment of the invention. Starting in operation 602, a node constructs a DRT lookup message. A DRT lookup message asks a node to search for a particular key in its local DRT. Next, in operation 604, the node sends the DRT lookup message to a node. In turn, the node receiving the DRT lookup message requests authentication from the sending node and the sending node provides its security ID to the receiving node (operation 606). In an alternative embodiment, the security ID is provided by including the security ID in the DRT lookup message in operation 604.

Flowchart 700 shows operations of receiving a DRT lookup message in accordance with an embodiment of the invention. Starting in operation 702, a node receives a DRT lookup message. Next, in operation 704, the logic authenticates a security ID of the node sending the DRT lookup message. In one embodiment, the receiving node requests the sending node's security ID in an inquire message and receives the sending node's security ID in an authority message from the sending node. In another embodiment, the sending node's security ID is included in the DRT lookup message itself.

In another embodiment, authentication includes checking anti-tampering mechanisms included in a DRT message associated with a key lookup. In this embodiment, in each of the lookup/inquire/authority messages, anti-tampering mechanisms are employed where the sending node "secures" parts of the message with digital signatures that are validated by the receiving node.

If the security ID is authenticated, then the logic proceeds to operation 708 to process the DRT lookup message. In one embodiment, to process the DRT lookup message, the node looks for the desired key in its local DRT and returns the corresponding network address if the key is found. If the node does not find the desired key, then the node returns the network address for the closest key in the node's local DRT.

If the security ID fails authentication, then the logic proceeds to operation 706 to fail the DRT lookup message. For example, the failed message may be ignored or responded to with an error message.

Figure 8:
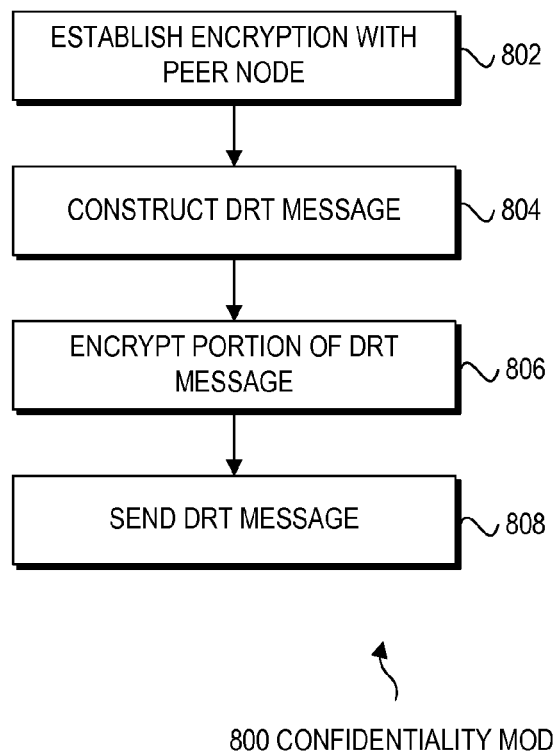
FIG. 8 is a flowchart showing operations of a confidentiality security mode for a distributed routing table in accordance with an embodiment of the invention.
Figure 9:
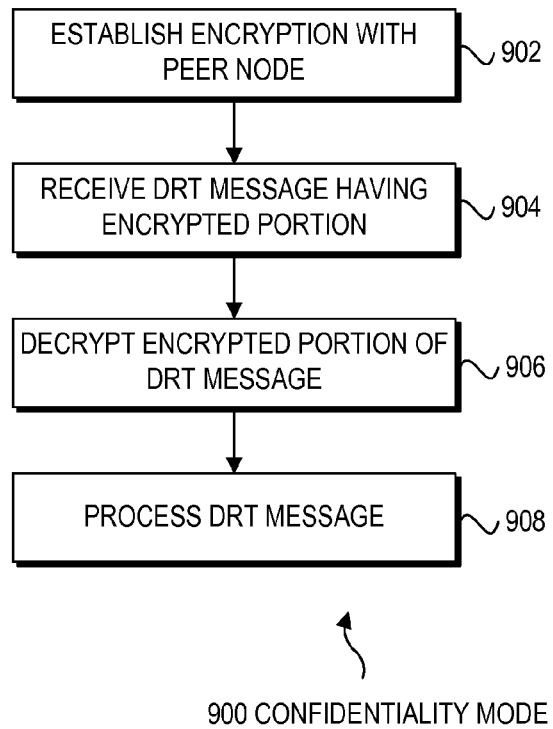
FIG. 9 is a flowchart showing operations of a confidentiality security mode for a distributed routing table in accordance with an embodiment of the invention.

Turning to FIGS. 8-9, flowcharts 800 and 900 show operations of a confidentiality security mode in accordance with an embodiment of the invention. In one embodiment, at least a portion of flowcharts 800 and 900 may be implemented by computer readable instructions executable by one or more computing devices. In another embodiment, logic of flowcharts 800 and/or 900 are implemented by a security module at a node.

Confidentiality security mode includes the publish key and key lookup security measures as described above in connection with FIGS. 4-7. In addition, confidentiality mode encrypts at least a portion of DRT messages between nodes in a mesh.

Flowchart 800 shows operations of sending a DRT message when in confidentiality security mode in accordance with an embodiment of the invention. Starting in operation 802, the sending node establishes encryption with the peer node. The encryption may include an asymmetric key scheme (e.g., public/private key), a symmetric key scheme, a hybrid scheme (e.g., use asymmetric keys to distribute symmetric keys, and then use the symmetric keys for follow on communications), and the like. For example, in a private/public key pair encryption scheme, the sending node asks the receiving node to compute a public/private key pair and sends the public key to the sending node.

In another example, in hybrid mode, the sending node generates a symmetric key that is used for encrypting parts of the message and encrypts the symmetric key with the target node's public key. The encrypted symmetric key is included in the message. The target node (i.e., the receiving node) obtains the symmetric key by decrypting it with its private key. In this scheme, privacy is achieved without prior key exchange of the symmetric keys. The target node's public key is obtained in a prior exchange. It is cached in the source node for use when sending messages to the target node.

Next in operation 804, the node constructs the DRT message. Continuing to operation 806, the sending node encrypts at least a portion of the DRT message. For example, the sending node may encrypt a portion using the key as derived in operation 802. Next, in operation 808, the DRT message is sent to a receiving node.

In one embodiment, the encryption established between two nodes in a mesh is unique for that node pair. For example, in FIG. 2, a key pair (e.g., symmetric or asymmetric) used by nodes 201 and 202 is different than a key pair used by nodes 201 and 205.

Flowchart 900 shows operations of receiving a DRT message when in confidentiality security mode in accordance with an embodiment of the invention. Starting with operation 902, encryption with a peer node is established, such as setting up a symmetric or an asymmetric key pair. For example, the node to receive the DRT message may derive a public/private key pair. The receiving node then sends the public key to the sending node and keeps the private key.

Next, in operation 904, the receiving node receives a DRT message having at a portion that is encrypted. Continuing to operation 906, the receiving node decrypts the encrypted portion. For example, the receiving node uses its private key for decryption. Next, in operation 908, the receiving node processes the DRT message as appropriate. In one embodiment, a security module establishes a hybrid encryption scheme that sends a symmetric key along with the DRT message as described above.

Embodiments of the confidentiality secure mode obscure parts of a DRT message from prying eyes. This way, intermediate entities, such as routers between two nodes, are prevented from seeing sensitive aspects of a DRT message. Example portions that may be encrypted include a part of a message for resolving the IP address associated with a key, an application payload, a collection of IP addresses that a node has in its local DRT, etc. In one instance, only a portion of a DRT message is encrypted so that an intermediate entity, such as an Internet Service Provider (ISP), may determine that a message is related to P2P activity, but still not view sensitive parts of the DRT message.

Embodiments of the invention are directed to security modes for a distributed routing table. An application author may assign a security mode as appropriate for the sensitivity of information to be handled by a mesh. The ability to add security as necessary makes a DRT a suitable platform for a wide range of public and commercial P2P systems. DRT security modes may support large open systems, like PNRP, as well as controlled private corporate P2P networks.

Figure 10:
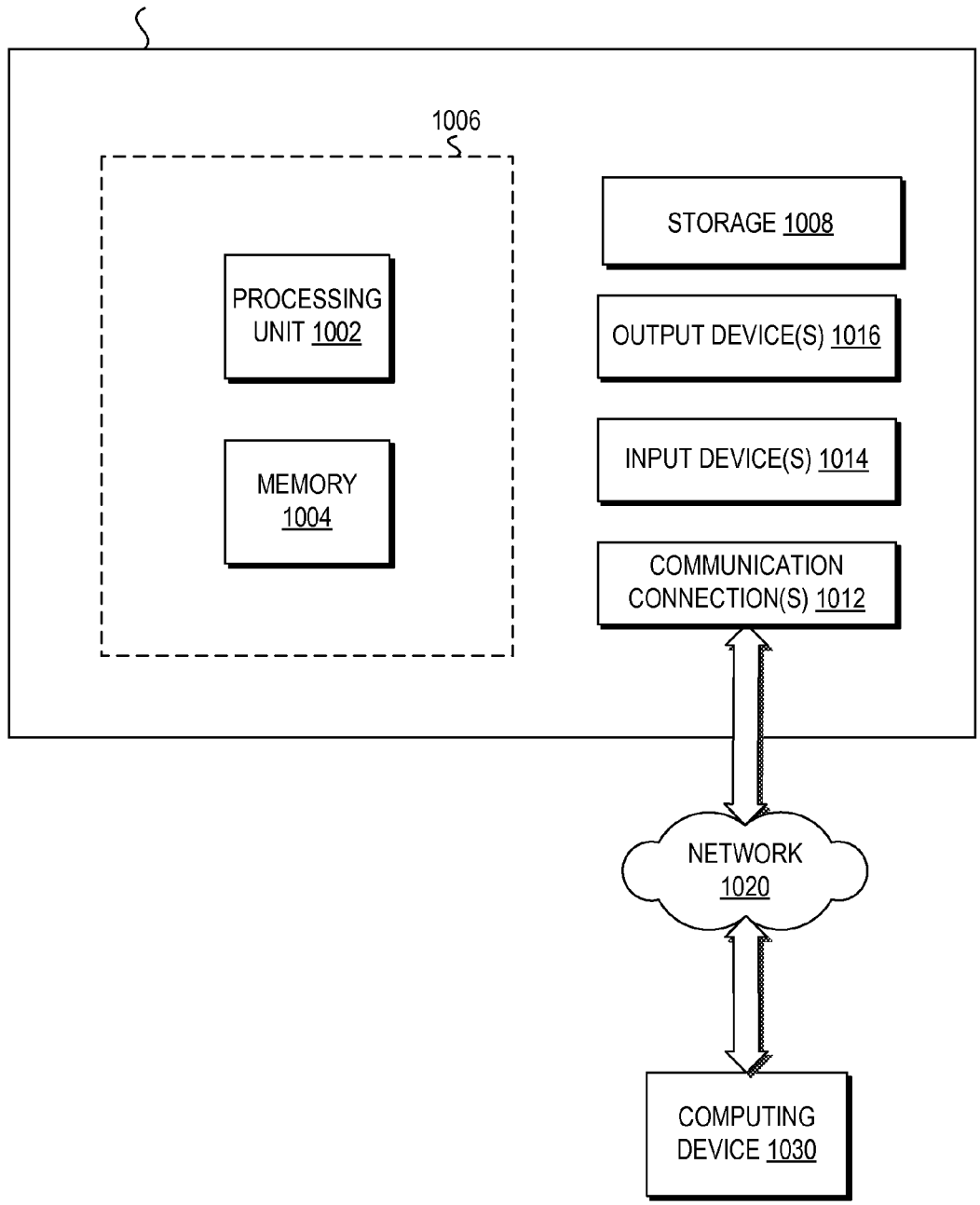
FIG. 10 is a block diagram of an example computing device for implementing embodiments of the invention.

FIG. 10 and the following discussion provide a brief, general description of a suitable computing environment to implement embodiments of the invention. The operating environment of FIG. 10 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 shows an example of a computing device 1000 for implementing one or more embodiments of the invention. In one configuration, computing device 1000 includes at least one processing unit 1002 and memory 1004. Depending on the exact configuration and type of computing device, memory 1004 may be volatile (such as RAM), non-volatile (such as ROM, flash memory, etc.) or some combination of the two. This configuration is illustrated in FIG. 10 by dashed line 1006.

In other embodiments, device 1000 may include additional features and/or functionality. For example, device 1000 may also include additional storage (e.g., removable and/or non-removable) including, but not limited to, magnetic storage, optical storage, and the like. Such additional storage is illustrated in FIG. 10 by storage 1008. In one embodiment, computer readable instructions to implement embodiments of the invention, such as security module 124, node 121, and application 131, may be in storage 1008. Storage 1008 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 1004 and storage 1008 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1000. Any such computer storage media may be part of device 1000.

Device 1000 may also include communication connection(s) 1012 that allow device 1000 to communicate with other devices. Communication connection(s) 1012 may include, but is not limited to, a modem, a Network Interface Card (NIC), an integrated network interface, a radio frequency transmitter/receiver, an infrared port, a USB connection, or other interfaces for connecting computing device 1000 to other computing devices. Communication connection(s) 1012 may include a wired connection or a wireless connection. Communication connection(s) 1012 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 1000 may include input device(s) 1014 such as keyboard, mouse, pen, voice input device, touch input device, infrared cameras, video input devices, and/or any other input device. Output device(s) 1016 such as one or more displays, speakers, printers, and/or any other output device may also be included in device 1000. Input device(s) 1014 and output device(s) 1016 may be connected to device 1000 via a wired connection, wireless connection, or any combination thereof. In one embodiment, an input device or an output device from another computing device may be used as input device(s) 1014 or output device(s) 1016 for computing device 1000.

Components of computing device 1000 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1000 may be interconnected by a network. For example, memory 1004 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 1030 accessible via network 1020 may store computer readable instructions to implement one or more embodiments of the invention. Computing device 1000 may access computing device 1030 and download a part or all of the computer readable instructions for execution. Alternatively, computing device 1000 may download pieces of the computer readable instructions, as needed, or some instructions may be executed at computing device 1000 and some at computing device 1030. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
   receiving, by a first node of a distributed mesh, a DRT flood message from a second node of the distributed mesh, wherein the first node stores a local portion of a Distributed Routing Table (DRT), the DRT being distributed across the mesh for determining addresses of individual nodes of the mesh, wherein the DRT is configured to implement a set of one or more DRT security modes allowing the DRT to be configured with one or more security settings for the mesh;
   storing a security identification (ID) for the first node, the security ID for the first node having a first issuer;
   determining a security identification (ID) for the second node, the security ID for the second node having a second issuer;
   comparing the second issuer of the security ID for the second node with the first issuer of the security ID for the first node;
   when the second issuer matches the first issuer:
      authenticating the DRT flood message; and
      updating the local portion of the DRT stored on the first node with a key or IP address included in the DRT flood message received from the second node; and
   when the second issuer does not match the first issuer, failing the DRT flood message.

2. The method of claim 1, wherein at least a portion of the DRT flood message is encrypted, the method further comprising:
   a decrypting the portion of the DRT flood message.

3. The method of claim 1, further comprising:
   receiving the security ID for the first node from a security identification service.

4. One or more computer readable storage media including computer readable instructions that when executed by a computing device perform operations comprising:
   receiving a security identification (ID) from a security ID service;
   executing an application for use with a peer-to-peer mesh comprising a Distributed Routing Table (DRT) for determining addresses of nodes of the peer-to-peer mesh, wherein the DRT is configured to implement a set of DRT security modes allowing the DRT to be configured with DRT security settings for the peer-to-peer mesh, and wherein the application is pre-programmed with at least one of the DRT security settings; and
   processing a DRT message, from an individual node of the peer-to-peer mesh or joining the peer-to-peer mesh, in accordance with at least one of the DRT security modes using the security ID, wherein the at least one DRT security mode provides access to at least part of the DRT based on whether the DRT message is authenticated.

5. The one or more computer readable storage media of claim 4 wherein the DRT message comprises a DRT flood message sent to a receiving node of the peer-to-peer mesh; the operations further comprising providing the security ID to the receiving node when requested by the receiving node.

6. The one or more computer readable storage media of claim 4 wherein processing the DRT message includes:
   when the at least one DRT security mode includes a basic mode,
      receiving the DRT message, wherein the DRT message includes a DRT flood message;
      authenticating the DRT flood message using the security ID;
      when the DRT flood message is authenticated, processing the DRT flood message; and
      when the DRT flood message is not authenticated, failing the DRT flood message.

7. The one or more computer readable storage media of claim 4 wherein processing the DRT message includes:
   when the at least one DRT security mode includes a membership mode,
      receiving the DRT message, wherein the DRT message includes a DRT lookup message;
      authenticating the DRT lookup message using the security ID;
      when the DRT lookup message is authenticated, processing the DRT lookup message; and
      when the DRT lookup message is not authenticated, failing the DRT lookup message.

8. The one or more computer readable storage media of claim 4 wherein processing the DRT message includes:
   when the at least one DRT security mode includes a confidentiality mode,
      constructing the DRT message;
      encrypting a portion of the DRT message; and
      sending the DRT message.

9. The one or more computer readable storage media of claim 4 wherein processing the DRT message includes:
   when the DRT security mode includes a confidentiality mode,
      receiving the DRT message, wherein a portion of the DRT message is encrypted;
      decrypting the encrypted portion of the DRT message; and
      processing the DRT message.

10. The one or more computer readable storage media of claim 9 wherein the computer readable instructions when executed further perform operations comprising:
    establishing an encryption scheme with the individual node.

11. A peer-to-peer mesh, comprising:
    a plurality of nodes, wherein individual nodes store corresponding portions of a Distributed Routing Table (DRT) as local DRTs, and wherein the DRT is configured to implement a set of DRT security modes; and
    a first security module corresponding to a first node of the plurality of nodes, wherein the first security module is configured to operate in accordance with at least one DRT security mode of the set of DRT security modes by:
       receiving a DRT message from a second node of the plurality of nodes;
       comparing a security identification (ID) of the first node with a security ID of the second node;
       when issuers of the security ID of the first node and the security ID of the second node match, authenticating the DRT message and accessing the local DRT for the first node, based on the DRT message; and failing the DRT message when the issuers of the security IDs of the first node and the second node do not match.

12. The method of claim 1, wherein the security ID of the second node is included in the DRT flood message.

13. The method of claim 1, wherein the DRT flood message signals a presence of a key for the second node.

14. The method of claim 13, wherein updating the local portion of the DRT stored on the first node includes adding the key for the second node to the local portion of the DRT.

15. The method of claim 1, wherein each of the individual nodes of the mesh stores a portion of the DRT as a local DRT.

16. The method of claim 15, further comprising:
receiving a DRT lookup message asking the first node to search for a key for the second node in the local portion of the DRT stored on the first node.

17. The peer-to-peer mesh of claim 11, wherein the DRT message comprises a DRT flood message published by the second node and signaling a presence of a key for the second node.

18. The peer-to-peer mesh of claim 17, wherein the first security module is further configured to add the key to the local DRT for the first node, when the issuer of the security ID of the first node matches the issuer of the security ID of the second node.

19. The peer-to-peer mesh of claim 11, wherein the DRT message comprises a DRT lookup message asking one or more of the individual nodes to search the local DRTs for a key for the an individual node.

20. The peer-to-peer mesh of claim 19, further comprising:
when the DRT lookup message is authenticated, responding to the DRT lookup message with a network address corresponding to the key for the individual node; and
when the DRT lookup message is failed, ignoring the DRT lookup message or responding to the DRT lookup message with an error message.

* * * * *

UNITED STATES PATENT AND TRADEMARK OFFICE
CERTIFICATE OF CORRECTION

| | | |
|---|---|---|
| PATENT NO. | : 7,987,290 B2 | |
| APPLICATION NO. | : 11/963782 | |
| DATED | : July 26, 2011 | |
| INVENTOR(S) | : Kevin C. Ransom et al. | |

It is certified that error appears in the above-identified patent and that said Letters Patent is hereby corrected as shown below:

In column 11, line 45, in Claim 2, before "decrypting" delete "a".

In column 14, line 9, in Claim 19, before "an" delete "the".

Signed and Sealed this
Thirtieth Day of August, 2011

David J. Kappos
*Director of the United States Patent and Trademark Office*